(12) United States Patent
Loeb et al.

(10) Patent No.: US 8,238,940 B2
(45) Date of Patent: Aug. 7, 2012

(54) SYSTEM AND METHOD FOR PERFORMING NON-COMMERCIAL MESSAGING

(75) Inventors: Michael R. Loeb, New York, NY (US); Edward J McCabe, Yonkers, NY (US)

(73) Assignee: Loeb Enterprises, LLC, New York, NY (US)

( * ) Notice: Subject to any disclaimer, the term of this patent is extended or adjusted under 35 U.S.C. 154(b) by 0 days.

(21) Appl. No.: 12/807,412

(22) Filed: Sep. 4, 2010

(65) Prior Publication Data

US 2011/0053611 A1    Mar. 3, 2011

Related U.S. Application Data

(62) Division of application No. 11/483,994, filed on Jul. 10, 2006, now Pat. No. 7,813,743.

(51) Int. Cl.
*H04W 24/00* (2009.01)
(52) U.S. Cl. .............. 455/456.3; 455/456.1; 455/456.2
(58) Field of Classification Search ............... 455/456.3
See application file for complete search history.

(56) References Cited

U.S. PATENT DOCUMENTS

| | | | |
|---|---|---|---|
| 7,336,963 B1 * | 2/2008 | Rayburn et al. | 455/456.3 |
| 2006/0040678 A1 * | 2/2006 | Kwon | 455/456.3 |

* cited by examiner

*Primary Examiner* — Nick Corsaro
*Assistant Examiner* — Amanuel Lebassi
(74) *Attorney, Agent, or Firm* — Buckley, Maschoff & Talwalkar LLC (57) ABSTRACT

Methods and Systems are provided for forwarding location dependent messages from a first user's mobile device over a wireless communication network to a second user's mobile device, via a central server.

35 Claims, 8 Drawing Sheets

FIG. 3 cnt'd

*ONE TO MANY PROCESS*

*FIG. 4*

FIG. 4 cnt'd

FIG. 5

*DATING*

FIG. 6

SYSTEM AND METHOD FOR PERFORMING NON-COMMERCIAL MESSAGING

CROSS-REFERENCE TO RELATED INVENTIONS

This application is a divisional of U.S. patent application Ser. No. 11/483,994 filed on Jul. 10, 2006, now U.S. Pat. No. 7,813,743 entitled "Location Dependent Non-Commercial Messaging", which application is incorporated herein by reference in its entirety. This application also claims the benefit of and priority to U.S. Pat. No. 7,729,709, filed on Jul. 10, 2006, entitled "Location Dependent Commercial Messaging", which application is incorporated herein by reference in its entirety and is cross-referenced to U.S. patent application Ser. No. 11/483,994 filed on Jul. 10, 2006, entitled "Location Dependent Non-Commercial Messaging".

FIELD OF THE INVENTION

The present invention relates generally to the field of mobile wireless communication systems and more particularly to a method and system for delivering location dependent messaging.

BACKGROUND OF THE INVENTION

Wireless communication devices have recently evolved from a technology used by an elite segment of the population to a technology that is used by the masses. Worldwide, the number of wireless communication device users has reached a staggering number and is growing all of the time. In the near future, it is envisioned that almost everyone will own or use some sort of wireless communication device that is capable of performing a variety of functions

SUMMARY OF THE INVENTION

According to a method embodiment, a method for forwarding location dependent messages from a first user's mobile device over a wireless communication network to a second user's mobile device, via a central server is provided, the method comprising: selecting, by a first user, a second user from among a plurality of pre-approved linked users as an intended recipient of a location dependent message constructed by said first user, selecting, by the first user, a pre-scribed geographic region as a pre-condition for transmitting the location dependent from the first users mobile device via a central server to the second user's mobile device as intended recipient of the location dependent message, including the selected prescribed geographic region as part of the constructed location dependent message, transmitting the constructed location dependent message from the first user's mobile device to the central server, the message including the selected prescribed geographic region, extracting the prescribed geographic region from the received location dependent message upon receipt at the central server, periodically monitoring, at the central server, in response to receiving the location dependent message, a current geographic location of said second user as intended recipient of the location dependent message to determine if the second user upon determining that the second user's geographic location is within a pre-defined geographic proximity of the prescribed geographic region included in the received location dependent message, and forwarding the location dependent message from the central server to the second user upon determining that the second user has entered within the prescribed geographic region in accordance with the periodic monitoring step.

According to a system embodiment, a system is provided for forwarding location dependent messages from a first user's mobile device to a second user's mobile device, the system comprising: a plurality of mobile devices operable in a communication network, each device configured to permit determination of its geographic location, wherein the plurality of mobile devices are linked with each other in an established network of pre-approved linked users, a central server configured to receive location dependent messages transmitted from each of said plurality of mobile devices in said network, said central server being further configured to transmit validated location dependent messages to intended recipient mobile devices in accordance with a message transmission protocol, a central server managing entity for managing functions associated with said central server, said functions comprising: validating the location dependent messages received at the central server, wherein validation comprises validating the geographic location specified in the location dependent messages received at the central server, polling the geographic locations of at least one of said plurality of mobile devices in said network to determine if an intended recipient mobile device user has entered a geographic location specified in a location dependent message received at said central server, and transmitting validated location dependent messages to intended recipient mobile device users upon determining that at least one intended recipient mobile device user hast entered said geographic location specified in a location dependent message received at said central server.

DESCRIPTION OF THE DRAWING FIGURES

These and other objects, features and advantages of the present invention will be apparent from a consideration of the following Detailed Description of the invention, when considered in conjunction with the drawing Fingers, in which.

DETAILED DESCRIPTION

The invention is suitable for use with a wide variety of applications, including, but not limited to, games, restaurant recommendations, delivery of advertisement e-mails and solicitations to receptive parties interested in finding out about local events.

Figure 1:
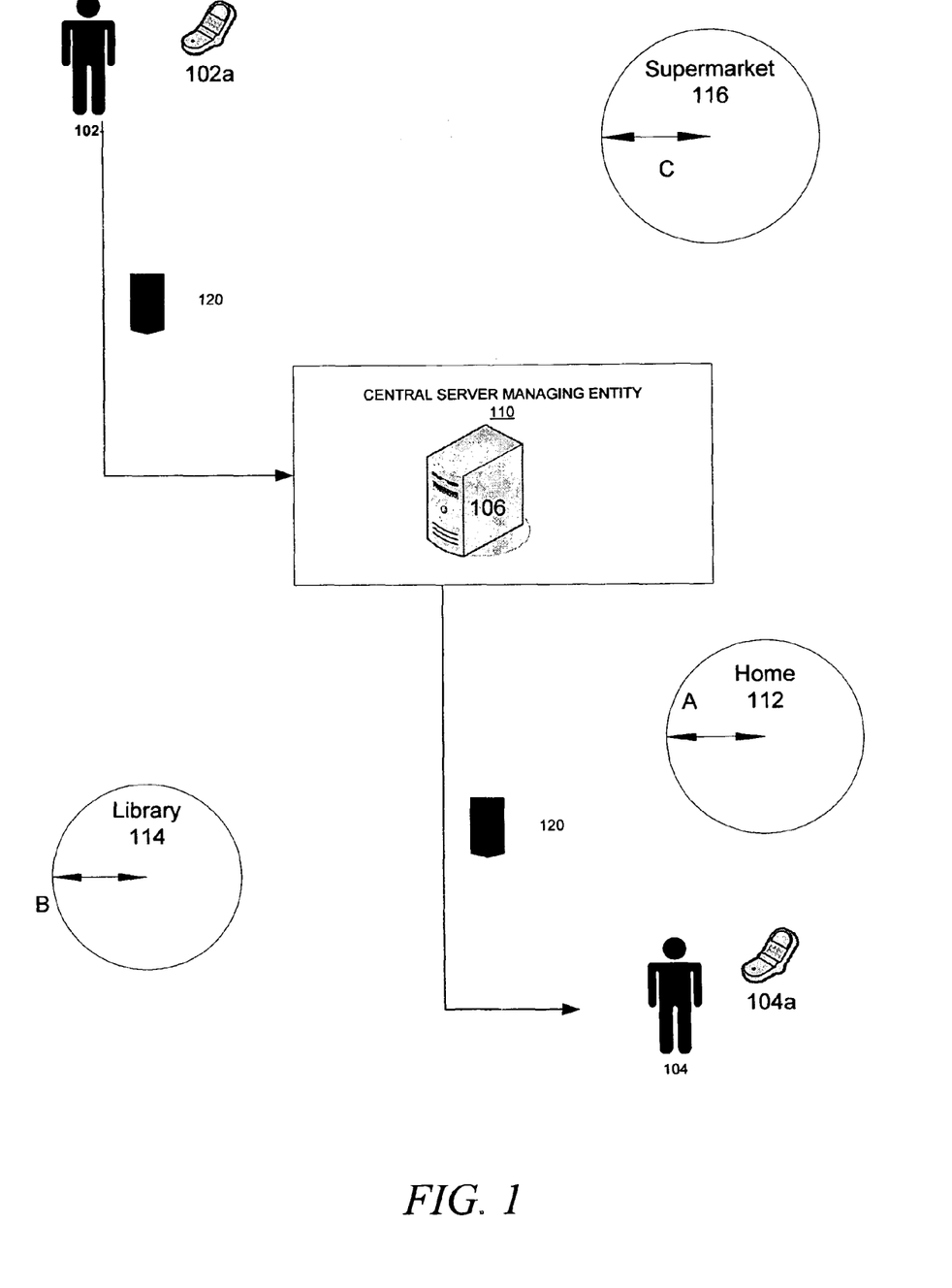
FIG. 1 is a block diagram of a system in accordance with the present invention.

With reference now to FIG. 1, there is shown and described a simplified SMS enabled communication system 100 in which the present invention may be utilized. The SMS system 100 comprises a plurality of cellular devices including a capability for determining the cellular devices location via signal triangulation methods or other methods. Two devices 102a, 102b are shown for ease of explanation. System 100 further comprises a central server 106, a central server managing entity 110 for performing a number of functions including, receiving and validating location dependent short text messages transmitted from various participants 102, 104 in the network, polling the geographic locations of one or more recipients specified in the location dependent short text messages to determine if an intended recipient has entered the geographic location specified in the message, and transmitting those validated location dependent short text messages to intended recipients in the case where the central server managing entity 110 determines that an intended recipient has entered the geographic location specified in the message.

The cellular devices 102a, 104a, allows a person 102, 104 having the mobile device 102a, 104a to receive position location information. In the described embodiments, a cell phone device is used for illustration purposes, but the device could be a PDA (Personal Digital Assistants), computer, walkie talkie, notebook computer, pager or any other device capable of receiving the transmitted message. It should be appreciated that a pre-requisite to carrying out location dependent SMS messaging is the geographic location of a recipient be determinable relative to a desired location. In the illustrated embodiment, this is done by having each mobile device 102a, 104a equipped with means for determining the mobile device's location. Determining a mobile device's location is well understood in the art and can be done through a number of means including GPS, assisted GPS, or RF triangulation of the signal from the cell sites serving the mobile device or by simply encountering an 802.11 or Bluetooth wireless access point, which effectively positions the device. Of course many other methods are known for recognizing the location of a recipient, for example rfid tagging, optical face or body characteristic recognition and others as will be known to the reader.

With continued reference to FIG. 1, by way of example, three geographic locations are shown for illustrating location dependent short text messaging according to invention principles. The three exemplary geographic locations include a home 112, library 114 and a supermarket 116. As will be described in greater detail below, the system 100 is operable to route a location dependent short text message 120 from the sender's mobile device 102a, via the central server 106, to an intended receiver's mobile device 104a contingent upon the intended receiver entering a prescribed radius surrounding a geographic location (e.g., radius A from home 112, radius B from the library 114, radius C from the supermarket 116, as shown in FIG. 1).

Figure 2:
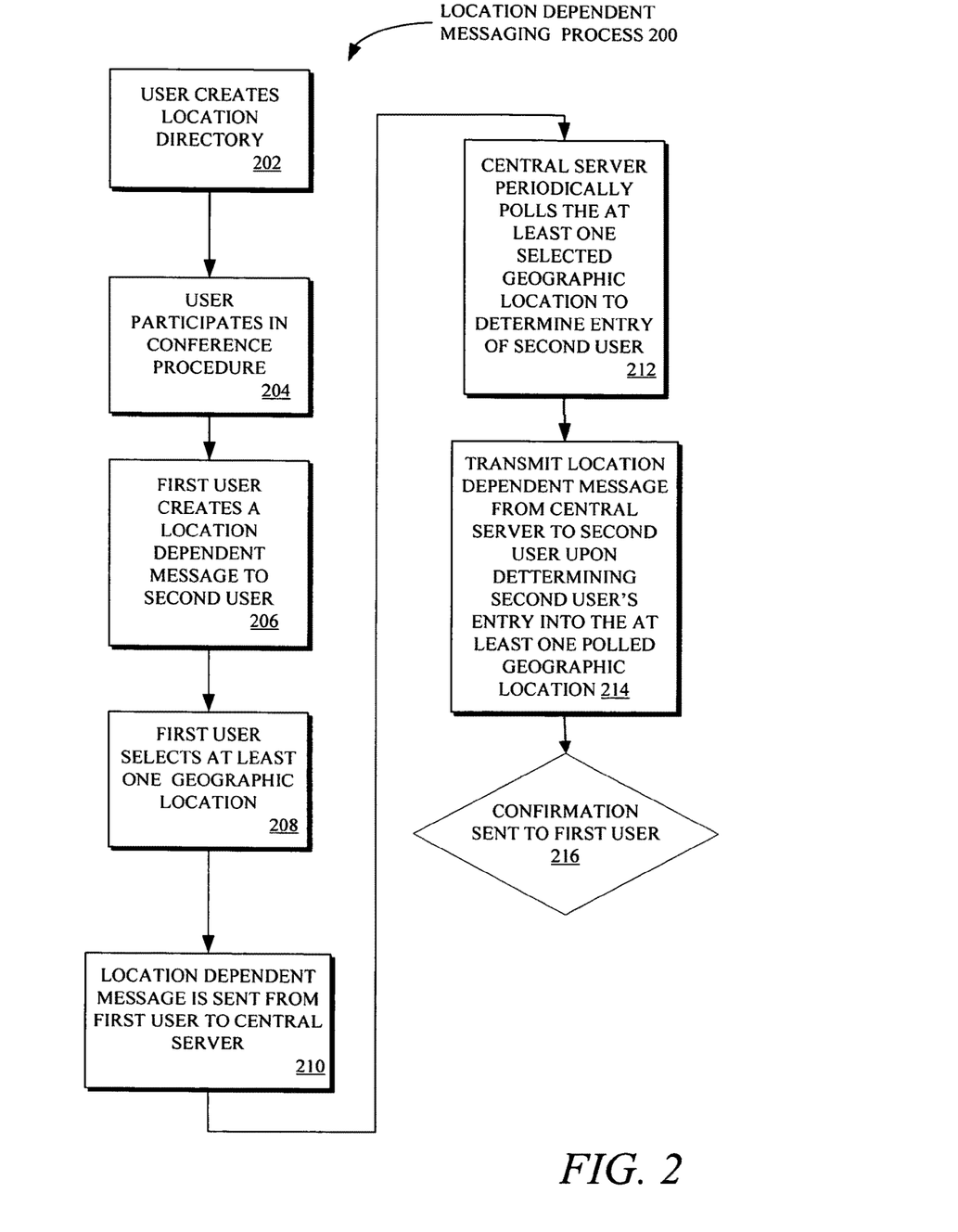
FIG. 2 is a flow chart showing a process in accordance with the present invention, according to one embodiment.
Figure 3:
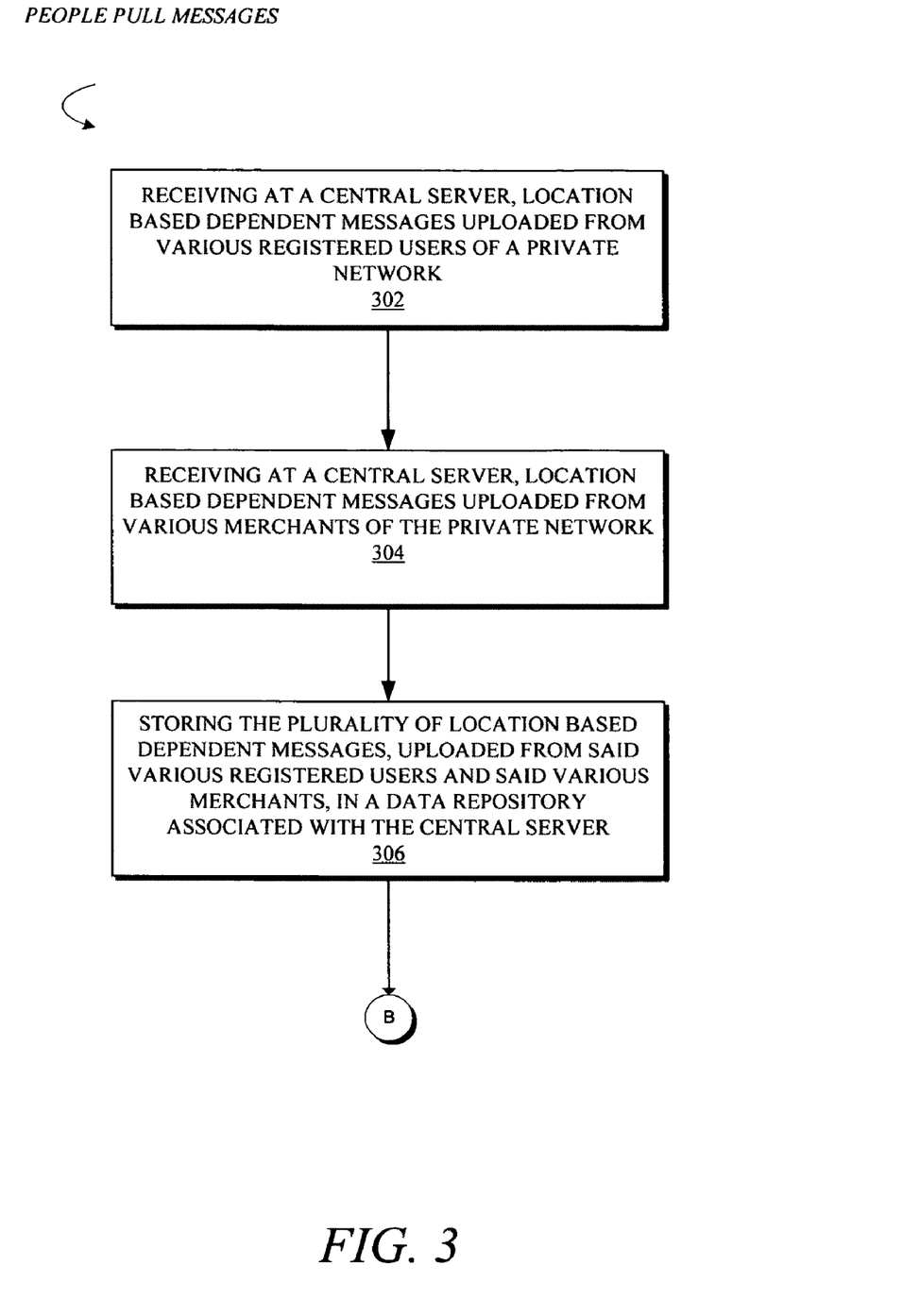
FIG. 3 is a flow chart showing a process in accordance with the present invention, according to one embodiment.
Figure 4:
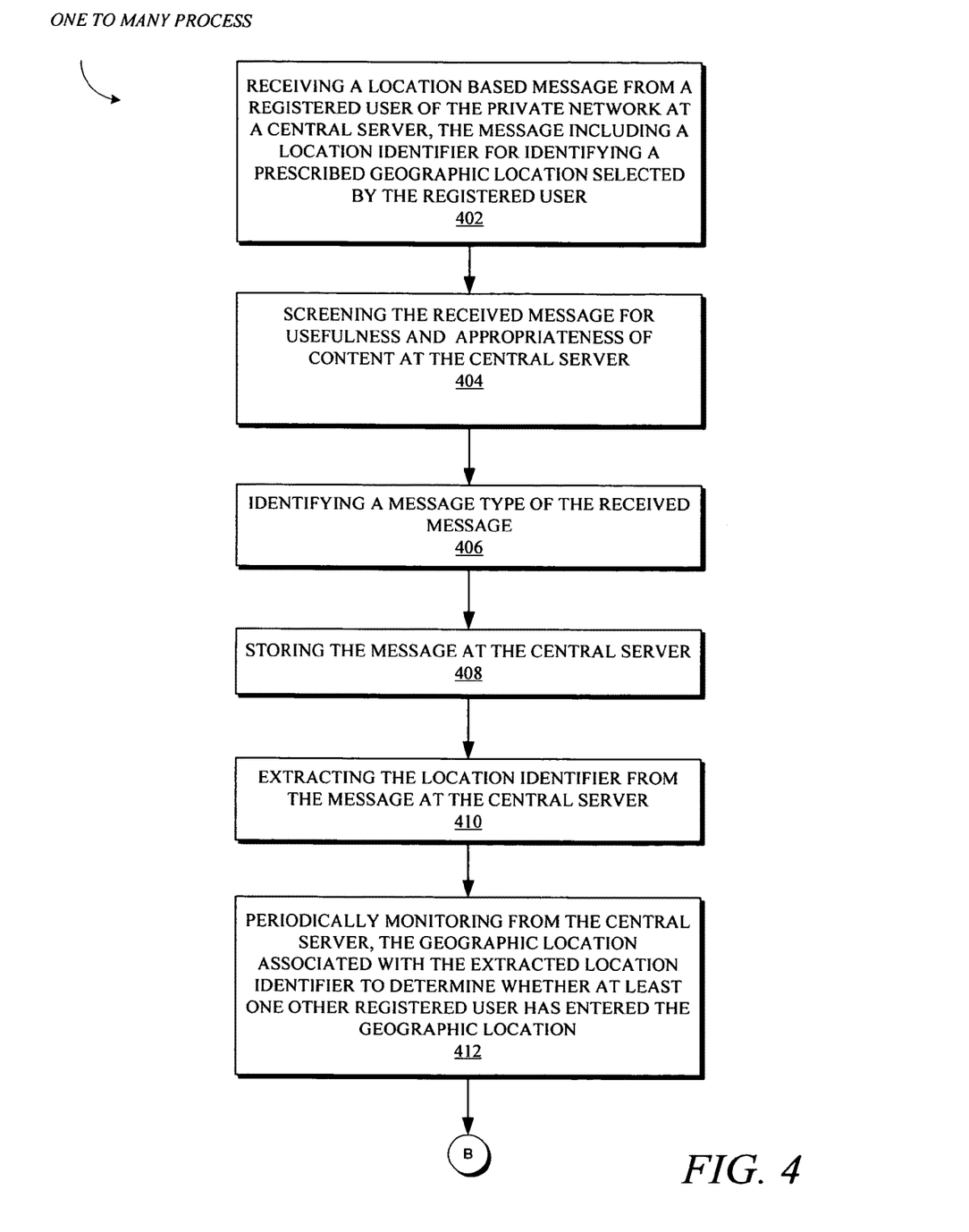
FIG. 4 is a flow chart showing a process in accordance with the present invention, according to one embodiment.
Figure 5:
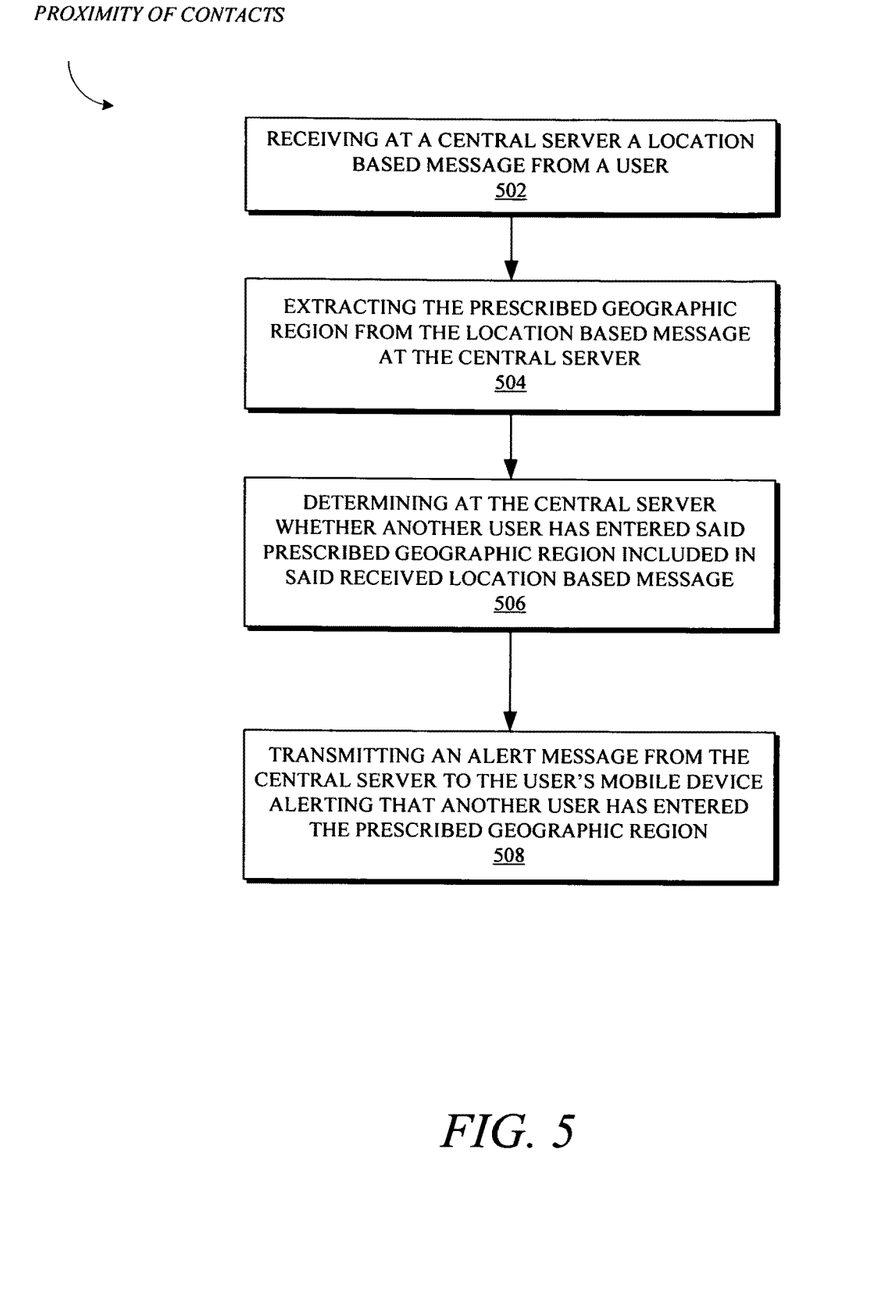
FIG. 5 is a flow chart showing a process in accordance with the present invention, according to one embodiment.
Figure 6:
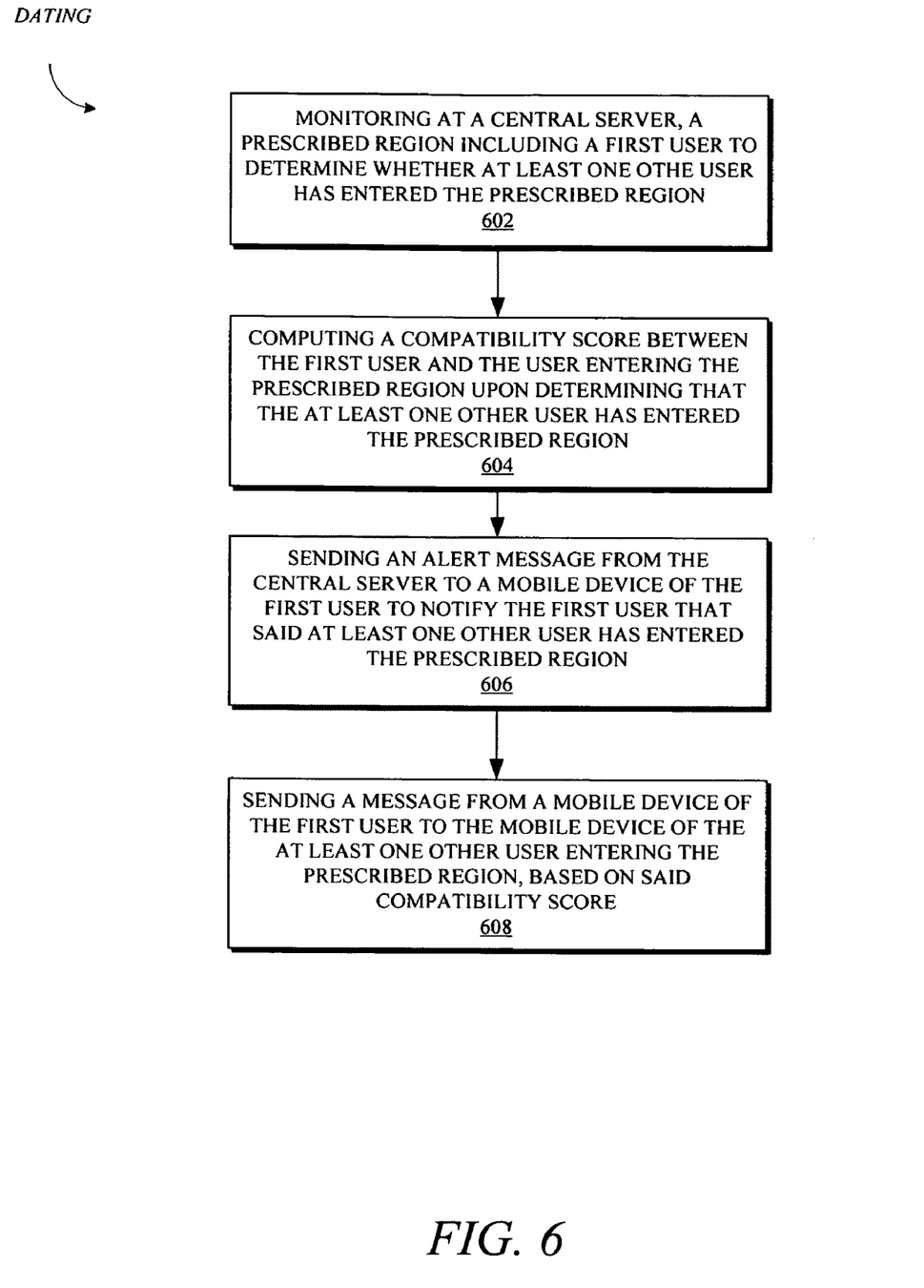
FIG. 6 is a flow chart showing a process in accordance with the present invention.

With reference now to FIG. 2, a method for forwarding location dependent short text messages to an intended recipient's GPS capable cellular phone based on the recipient's entry within a prescribed radius surrounding a pre-defined geographic location is described as follows.

At step 202, which is an optional step, a first user 102, at any point subsequent to purchasing a cellular phone 102a, a user may create a "location directory" and/or a "bookmark directory". A description of the construction of both the location directory and bookmark directory, according to one embodiment is described as follows. It should be appreciated that the creation of both the "location directory" and "bookmark directory" are optional. They are intended to facilitate location dependent short text messaging as taught herein, by providing means for quickly specifying a geographic location and radius (i.e., as provided by the location directory) as a short text message parameter and for quickly specifying both a geographic location and intended user (i.e., as provided by the bookmark directory) as a further short text message parameter.

Location Directory

As briefly discussed above, the first user 102, upon purchasing a GPS-enabled mobile cellular device 102a, the first user 102 (i.e., message sender) has the option of creating a "location directory" in a memory of the purchased device 102a. The location directory may be constructed via a customized application supported by the GPS-enabled mobile cellular device 102a. The location directory is preferably constructed as a plurality of records in a table, whereby each record comprises two fields, a geographic location and a corresponding radius. The geographic location defines preferred locations for sending location dependent short text messages to intended receivers. The radius defines the circumscribed region around the geographic location inside of which an intended receiver will be identified upon entry.

One way of simultaneously specifying the geographic location and an intended user is to access a so-called "bookmark directory", as described in greater detail below and illustrated in Table II. Other methods for specifying a geographic location include, for example, the message sender directly inputting the GPS coordinates of the location in the GPS-enabled cellular phone 102a, the message sender inputting an address, the message sender accessing a website, via the GPS-enabled cellular phone 102a, that provides capabilities for defining geographic locations such as Map-quest™ or Google™, or others as will be known to the reader. Alternatively, a message sender may specify one or more geographic locations without the assistance of a GPS-enabled cellular telephone 102a. For example, the message sender may specify one or more geographic locations via a remote terminal connected to a network, such as the Internet, to access the central server 106 storing the "bookmark directory.

In light of the various options for defining the geographic location, it is understood that the creation of a location directory is an optional step.

Table I illustrates, by way of example, a typical location directory that a user may create on his or her GPS-enabled mobile cellular device 102a.

TABLE I (Location Directory: For Exemplary User ID - 1429583)

| GEOGRAPHIC LOCATION | RADIUS |
|---|---|
| Home | 20 yards |
| Bank | 10 yards |
| Library | 50 yards |
| Supermarket | 35 yards |
| Bowling Alley | 40 yards |
| Restaurant | 10 yards |

Book-Mark Directory

As briefly discussed above, the first user 102, upon purchasing a GPS-enabled mobile cellular device 102a, has the option of creating a bookmark in a memory of the purchased device 102a. The bookmark may be constructed via a customized application supported by the GPS-enabled mobile cellular device 102a. The bookmark is preferably constructed as a plurality of records in a table format wherein each record defines an association between a user preferred geographic location with an intended recipient for receiving the location dependent short text messages upon arriving within a prescribed distance at the location.

It is contemplated that a user may create such "bookmark" associations following the sending of a location dependent text message. A user, after selecting the recipient and a geographic parameter, for example from a previously constructed location directory, has the option of identifying those two parameters as a popular combination and thus deserving of a "bookmark" entry (e.g., "Home—Beth (wife)"). In the future, rather than having to select both user and geographic location separately, the sender might expeditiously reference the bookmark directory rather than having to separately reference both a phone-directory and location directory.

Table II illustrates, by way of example, a typical "bookmark directory" that a user may create on his or her mobile cellular device 102*a*.

TABLE II (Bookmark: User 1429583)

| GEOGRAPHIC LOCATION | ASSOCIATED USER |
|---|---|
| Home | Beth (wife) |
| Home | Bobby (child) |
| Home | Sandra (child) |
| Supermarket | Frances (maid) |
| Bowling Alley | Ted (friend) |
| Restaurant | Al (boss) |

At step 204, the user is provided with the option of participating in a confirmation procedure to allow the user to "link" his or her phone number with other users thereby establishing a network of pre-approved participants. A description of a confirmation procedure, according to one embodiment is described as follows.

Confirmation Procedure

In addition to creating a location directory, a user, upon purchasing a GPS-enabled cellular phone 102*a*, is provided with the option of performing a confirmation procedure (204) to allow the user to "link" his or her phone number with other users thereby establishing a network of pre-approved "linked" users or participants, as stated above.

In the event a user elects to participate in the confirmation procedure to allow other "linked" users to reference their location and receive confirmation of message delivery, the confirmation procedure requires that users comply with one of two alternative pre-requisites. Each user has the option of providing a list of contacts, defining other "linked" users to a service provider or management entity. The management entity 110 compares each submitted list and wherever two users name each other in their respective lists, a match is identified and the matching users are identified by the management entity 110 as being "linked" users. Alternatively, in lieu of establishing "linked" user lists, as described above, a user may attempt to establish a link in real-time by sending a confirmation request in the form of a message to another user, where the recipient can confirm, approve or deny the linkage. The confirmation message may also be included as part of the geo-contingent message.

In operation, whenever a location dependent short text message is sent from a sending party to a linked participant, that participant (i.e., intended message receiver) is provided with the option of approving or denying the linkage. In the case where the participant approves the linkage, each participant (i.e., sender and receiver) is permitted to trade location dependent short text messages with each other and the sending party is permitted to reference the receiving parties' geographic location by receiving a confirmation that their message has been delivered.

At step 206, the first user 102 (message sender) sends a location dependent short text message to a second user 104 (intended message receiver) within his or her network of pre-approved participants by selecting the second user 104 from among the network of pre-approved participants established in the confirmation procedure.

At step 208, upon selecting an approved participant, the first user 102 (message sender) then selects a geographic location at which the intended second user 104 (intended message receiver) must enter, typically within a prescribed radius as described above, as a pre-condition for receiving the location dependent short text message. Selection of the geographic location may be performed in a number of ways. In particular, one way for the first user 102 to select a geographic location is by accessing the location or bookmark directories (see step 202). Another way for the first user 102 to select a geographic location is by entering appropriate GPS co-ordinates into the first user's GPS-enabled cellular phone 102*a*. Another way for the first user 102 to select a geographic location may is by accessing a map display of the type commonly used in commercially available vehicle navigation systems or offered by mapping services such as Map-Quest™ or Google™. The map could show the current location of the user's GPS-enabled cellular phone device 102*a* superimposed on a map. One example of a mapping service is the Sprint Family Location service, the details of which may be found at (https://sfl.sprintpcs.com/finder-sprint-family/). Yet another way to specify a delivery location is through the entry of an address, which server 110 may use to identify the selected geographical location. Yet another way to specify a delivery location is by accessing data, optionally stored in a database 130 at the server 110 (see FIG. 1), corresponding to the locations of a plurality of types of locations, such as, for example, "gas stations" and/or "bars" and/or "restaurants". The various locations may be organized in a directory/sub-directory format by category whereby the general directory comprises a list of location sub-categories, such as "gas stations" and "restaurants" and each sub-category is comprised of one or more retail center locations. In the case where the first user 102 already knows the name of the particular retail center, the name can be entered directly to determine location information without having to parse through the directory format. The location of each retail center or may be represented in the database 130 by any such identifying means, including local street address, city, township, county, state, country, zip-code, telephone area-code, telephone prefix, zone or region, and the like. Alternatively, the user may also be provided with the option of selecting one of the categories or sub-categories as generalized location for sending a text message. By way of example, a user may elect to send a text message to recipients that enter within a prescribed area of all "shopping malls". Then, whenever an intended recipient enters any one of the plurality of "shopping malls" represented in the database 130, a text message is sent.

In addition to specifying the geographic location, the first user 102 may optionally specify additional qualifying criteria, such as, a start time and an expiration time during which the location dependent message will be transmitted to the second user 104 upon entering within a prescribed radius of the selected geographic location. For example, the first user 102 may elect to send a location dependent short text message to his spouse when he or she arrives at their home 112, contingent upon the spouse arriving at home between the hours of 5 and 6 PM.

At step 210, the location dependent message is sent to the central server 106 for validation. In one embodiment, validation comprises the central server managing entity 110 validating the specified geographic location and whether or not delivery and confirmation is approved to the second user 104. Optionally, in the case where the location dependent short text message is approved at the central server 106, a confirmation message may be sent back to the first user 102 confirming that the message is in queue at the central server 106 for eventual delivery to the intended recipient 104. In another embodiment, the step of validation may be omitted.

At step 212, the central server 106 periodically polls the user selected geographic location to determine if the intended recipient 104 has entered the specified location.

At step 214, upon determining at the central server 106 that the intended recipient 104 has entered the specified geographic location, the location dependent message is transmitted to the intended recipient 104 upon entry. Optionally, at step 216, a confirmation of transmission and/or receipt of the message is sent to the transmitting user, provided that users are mutually confirmed.

In accordance with one exemplary, non-commercial embodiment, the user 102 is provided with the option of submitting location dependent messages to be submitted in accordance with three specific message types. Specifically, according to a first message type, a first user (message sender) may submit and send location dependent messages to a single message recipient 104 of the user's own choosing. Secondly, according to a second message type, the first user 102 may submit and send location dependent messages to a group of recipients of the their own choosing. One example of the afore-mentioned first message type is a husband electing to send a location dependent message to his wife (a single intended recipient) upon entering the supermarket 116. An example of the second message type is a husband electing to send a location dependent message to his wife and children (multiple intended recipients) upon entering their home 112.

In accordance with a third message type, the user may submit general messages posted to everyone in the general broadcast network. Delivery of these messages could be dictated by the managing entity 110 per the preferences of users that have elected to receive or query the network for such general messages. This third message type constitutes network property and become part of the public domain. In contrast to this third, public domain message type, the first and second message types constitute private message types.

One example of the third message type may be a band playing at a local bar interested in promoting an upcoming live appearance. One optional pre-requisite to allowing delivery of this type of message is that it is first approved by the central server management entity 110 for appropriateness of content. Specifically, delivery of the third message type is appropriately screened at the central server 106 by the management entity 110 for content and helpfulness to ensure that the results of searches performed by receiving parties, who are unknown to the sender or originator of the message, are relevant and that the system 100 is not misused. These public domain messages (e.g., band appearance information) delivered to these unknown recipients may be selected for delivery based upon the particular preferences of the recipients (e.g., live music) and become the property of a central server managing entity 110.

In an embodiment of the present invention, it is contemplated to use the location dependent text messages as a means of alerting users when one or more contacts of the user arrives within a certain geographic proximity of the user. In contrast with the previously described embodiments, which require the identification of a prescribed geographic area for sending a location dependent message (e.g., store, home, library), the present embodiment defines a proximity based short text messaging methodology in which a short text message is transmitted from a user to a contact of the user based on the user's geographic proximity to the contact. For example, a user, e.g., Fred, may be alerted whenever one of his contacts, e.g., Alissa, happens to be within a 5-mile radius of Fred. Notification of the arrival of a contact within the prescribed geographic proximity of the user may be made dependent upon a pre-approval process, as agreed to by all participating users. Approval may include, for example, approving an intended message recipient and a time at which a message may be sent.

In a related embodiment to that described immediately above, it is contemplated to use the proximity based text messaging methodology as a means of facilitating a networking service. The present embodiment is similar to that described above with regard to sending short text messages based on a user's relative proximity to a user contact. In contrast with the previous embodiment, however, it is assumed that the user is communicating or intending to communicate with another user that he or she does not know. As a pre-requisite, it is assumed that each user has opted to receive text messages from either the unknown parties. In accordance with this embodiment, whenever two participating users are determined to be within a prescribed geographic proximity of each other, the user's respective profiles are analyzed to determine if there are any aspects that match. If one or more aspects are determined to be a match, a proximity based short text message is transmitted.

In a related embodiment, it is contemplated that the afore-mentioned analysis step of determining whether respective profiles may match may be performed in advance of two participants arriving within a prescribed geographic proximity. In other words, instead of the profile matching process occurring in real-time, as described above, profile matching is performed "off-line", so as to establish, for each participant, a list of matching participants, which may be used to pre-qualify matching participants prior to their arrival within prescribed geographic area. In operation, whenever a second participant arrives within a prescribed geographical area whose profile has been pre-matched to a first participant in the geographical area, an message is automatically exchanged between the two participants making each aware of the other's presence. This precludes the need to perform an analysis in real-time to determine the potential for a match. The "off-line" non real-time profile matching may be performed periodically to account for possible updates in the respective participant's profiles.

In accordance with the present embodiment, personal profiles of registered users may be obtained by requesting that the users fill out an on-line survey similar to those offered by online dating services. Alternatively, in lieu of filling out a survey, the users may simply "opt-in" to receive these proximity based text messages as part of their membership with a particular online dating service. They may, for example, select desired characteristics of an individual they would like to meet as well as other parameters such as a time when they would like the system to search for matching users within their geographic area (e.g., evenings, weekends). For example, the users may only want to receive matching users information on Saturday nights. The user is provided the further option of turning the feature on/off at the user's discretion. For example, the feature may be turned on while the user is situated in a particular geographic location to search for matching users. To accommodate this on/off feature, the user profile is preferably stored in a memory of the mobile cellular device and may be recalled whenever the feature is enabled. A reply communication might be sent to the searching user with information about the individuals as well as further contact information such as a phone number. Care would be taken to ensure the privacy of individuals and that only relevant data that the user wants to share is shared at times in which they are looking to be matched with other users that fit their criteria.

While the invention has been described with respect to particular embodiments, it is not thus limited. Numerous changes and improvements within the scope of the invention will now be apparent to the reader.

What is claimed is:

1. A method for forwarding location dependent messages from a first user's mobile device over a wireless communication network to a second user's mobile device, via a central server, the method comprising:
   selecting, by a first user operating a first mobile device, a second user from among a plurality of pre-approved linked users as an intended recipient of a location dependent message constructed by said first user operating the first mobile device,
   selecting, by the first user operating the first mobile device, a prescribed geographic region as a pre-condition for transmitting the location dependent message from the first mobile device via a central server to a second mobile device associated with the second user as intended recipient of the location dependent message,
   including the selected prescribed geographic region as part of the constructed location dependent message,
   transmitting the constructed location dependent message from the first mobile device to the central server, the message including the selected prescribed geographic region,
   extracting the prescribed geographic region from the received location dependent message upon receipt at the central server,
   periodically monitoring, at the central server, in response to receiving the location dependent message, a current geographic location of said second mobile device as intended recipient of the location dependent message to determine if the geographic location of said second mobile device is within a pre-defined geographic proximity of the prescribed geographic region included in the received location dependent message, and
   forwarding the location dependent message from the central server to the second mobile device upon determining that the second mobile device has entered within the prescribed geographic region in accordance with the periodic monitoring step.

2. The method of claim 1, further comprising performing a confirmation procedure by a plurality of users including at least the first and second users to allow the plurality of users to link their phone numbers with other users, thereby establishing a network of pre-approved linked users.

3. The method of claim 1, further comprising validating the location dependent message at the central server comprising validating the prescribed region defined by the first user as part of the location dependent message.

4. The method of claim 3, wherein the step of validating the location dependent message at the central server further comprises:
   validating the selected geographic location, and
   validating delivery and confirmation approval to the second mobile device.

5. The method of claim 1, further comprising a step of creating a location directory on at least one of said mobile devices, the location directory including a plurality of records in a table in a memory of the mobile device, each record defining an association pair including a geographic location and a corresponding radius of circumference.

6. The method of claim 1, wherein the step of selecting a second user and geographic location is performed by selecting a record including a geographic location/radius of circumference from the location directory.

7. The method of claim 1, further including a step of establishing a network of pre-approved participants with whom to send and receive the location dependent messages.

8. The method of claim 7, wherein the network of pre-approved participants is established by linking telephone numbers of each user's mobile cellular device.

9. The method of claim 1, further including a step of the first user defining a location dependent message delivery start time and a corresponding location dependent message expiration time.

10. The method of claim 1, further comprising a step of creating a bookmark directory on at least one of said mobile devices, the bookmark directory including a plurality of records in a table in a memory of the mobile device, each record defining an association pair including an intended recipient and geographic location, wherein the intended recipient is an intended recipient of a location dependent message and the geographic location is a location dependent pre-condition transmitting the location dependent message.

11. The method of claim 1, wherein the location message is selected from the group comprising a short text message, an IM message, an e-mail message, a voice message and a video clip.

12. The method of claim 1, wherein the step of selecting a geographic location for sending the location dependent message to the intended recipients is selected from the group comprising entering GPS co-ordinates of the selected geographic location, entering a geographic location and radius, and selecting a geographic location from a mapping server and defining a radius around the selected geographic location.

13. The method of claim 1, wherein the mobile device is selected from the group comprising a Personal Digital Assistant (PDA), a cellular telephone, a personal computer, walkie talkie, notebook computer, pager and a laptop computer.

14. The method of claim 1, further comprising a step of the second user responding to a received location dependent message by an action selected from the group comprising: requesting, via a click selection, additional information responsive to said message and requesting, via a click selection, connection to a third party affiliated with the content of the message.

15. A method for forwarding location dependent messages from a first user's mobile device to a second user's mobile device in accordance with a proximity based messaging protocol, the method comprising:
   receiving, at a server system, a location dependent message transmitted from the first user's mobile device, the location dependent message including a prescribed geographic region,
   extracting the prescribed geographic region from the received location dependent message,
   periodically monitoring, under control of the server system, a current geographic location of at least a second user's mobile device, the at least second user's mobile device selected from a predefined messaging group defined by the first user, and
   transmitting the location dependent message from the server system to the at least second user's mobile device after the server system determines that the at least second user's geographic location is within a pre-defined geographic proximity of the prescribed geographic region included in the received location dependent message.

16. The method of claim 15, further comprising performing a confirmation procedure by a plurality of users including at least the first and second users to allow the plurality of users to link their phone numbers with other users, thereby establishing a network of pre-approved linked users.

17. The method of claim 15, further comprising the step of the first user constructing the predefined messaging group.

18. The method of claim 17, wherein the step of constructing the predefined messaging group comprises identifying the at least one other user for transmitting location dependent messages in accordance with said proximity based messaging protocol.

19. A system for forwarding location dependent messages from a first user's mobile device to a second user's mobile device, the system comprising:
- a plurality of mobile devices operable in a communication network, each mobile device configured to permit determination of its geographic location, wherein the plurality of mobile devices are linked with each other in an established network of pre-approved linked users,
- a central server configured to receive location dependent messages transmitted from each of said plurality of mobile devices in said network, said central server being further configured to transmit validated location dependent messages to intended recipient mobile devices in accordance with a message transmission protocol,
- a central server managing entity for managing functions associated with said central server, said functions comprising:
  - validating the location dependent messages received at the central server, wherein validation comprises validating the geographic location specified in the location dependent messages received at the central server,
  - polling the geographic locations of at least one of said plurality of mobile devices in said network to determine if an intended recipient mobile device has entered a geographic location specified in a location dependent message received at said central server, and
  - transmitting validated location dependent messages to at least one intended recipient mobile device upon determining that at least one intended recipient mobile device has entered said geographic location specified in a location dependent message received at said central server.

20. The system of claim 19, wherein validating the location dependent message comprises the central server managing entity validating the geographic location specified in the location dependent message and determining that said intended recipient mobile device user has pre-approved delivery and confirmation.

21. The system of claim 19, wherein said functions associated with said central server further comprises sending a confirmation message back to each mobile device user transmitting a location dependent message to said central server upon receiving approval for said transmitted location dependent message.

22. A method for forwarding location dependent messages from a first user's mobile device to a second user's mobile device, the method comprising:
- selecting, by the first user operating said first user's mobile device, the second user from among a plurality of users as an intended recipient of a location dependent message,
- selecting, by the first user operating said first user's mobile device, a prescribed region defined as a prescribed distance from a geographic location defining a pre-condition for transmitting the location dependent message to the second user's mobile device,
- transmitting the location dependent message from the first user mobile device to a central server, the location dependent message including information identifying the prescribed region selected by the first user,
- periodically monitoring, by the central server, a current geographic location of the second user's mobile device to determine if the second user's mobile device enters within the prescribed region selected by the first user, and
- transmitting the location dependent message from the central server to the second user's mobile device after determining that the second user's mobile device has entered within the prescribed region as determined by the periodic monitoring.

23. The method of claim 22, further comprising performing a confirmation procedure by a plurality of users including at least the first and second users operating the first and second mobile devices to allow the plurality of users to link their phone numbers with other users, thereby establishing a network of pre-approved linked users.

24. The method of claim 23, wherein the means for validating the location dependent message at the central server further comprises:
- means for validating the selected geographic location, and
- means for validating delivery and confirmation approval to the second user's mobile device.

25. The method of claim 22, further comprising means for validating the location dependent message at the central server.

26. The method of claim 22, further comprising means for creating a location directory on at least one of said mobile devices, the location directory including a plurality of records in a table in a memory of the mobile device, each record defining an association pair including a geographic location and a corresponding radius of circumference.

27. The method of claim 22, wherein the means for selecting a geographic location comprises selecting a record including a geographic location/radius of circumference from the location directory.

28. The method of claim 27, wherein the network of pre-approved participants is established by linking telephone numbers of each user's mobile device.

29. The method of claim 22, further comprising means for establishing a network of pre-approved participants with whom to send and receive the location dependent messages.

30. The method of claim 22, further comprising means for the first user to operate the first user's mobile device to define a location dependent message delivery start time and a corresponding location dependent message expiration time.

31. The method of claim 22, further comprising means for creating a bookmark directory on at least one of said mobile devices, the bookmark directory including a plurality of records in a table in a memory of the mobile device, each record defining an association pair including an intended recipient and geographic location, wherein the intended recipient is an intended recipient of a location dependent message and the geographic location is a location dependent pre-condition transmitting the location dependent message.

32. The method of claim 22, wherein the location message is selected from the group comprising a short text message, an IM message, an e-mail message, a voice message and a video clip.

33. The method of claim 22, wherein the step of selecting a geographic location for sending the location dependent message to the intended recipients is selected from the group comprising entering GPS co-ordinates of the selected geographic location, entering a geographic location and radius, and selecting a geographic location from a mapping server and defining a radius around the selected geographic location.

34. The method of claim 22, wherein the mobile device is selected from the group comprising a Personal Digital Assistant (PDA), a cellular telephone, a personal computer, walkie talkie, notebook computer, pager and a laptop computer.

35. The method of claim 22, further comprising means for responding, by the second user operating the second user's mobile device, to a received location dependent message.

* * * * *